Dec. 6, 1960     H. P. STOCK     2,962,923
SLIP-ON PLASTIC FASTENER RING
Original Filed March 16, 1954
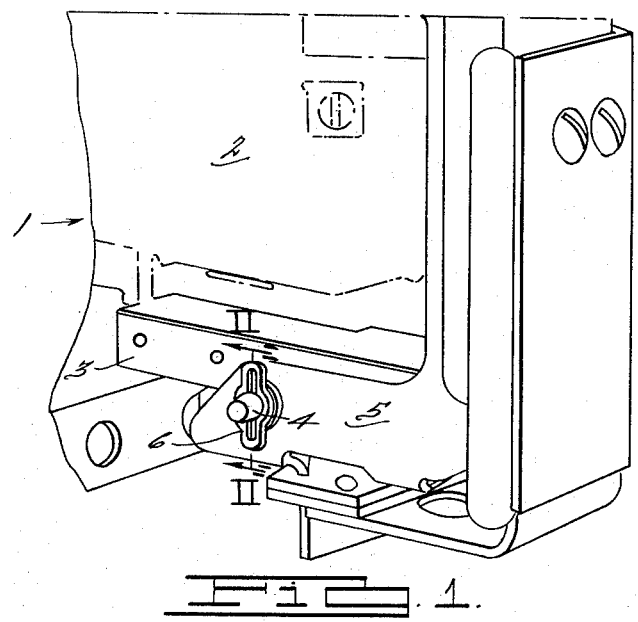
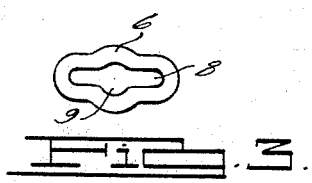
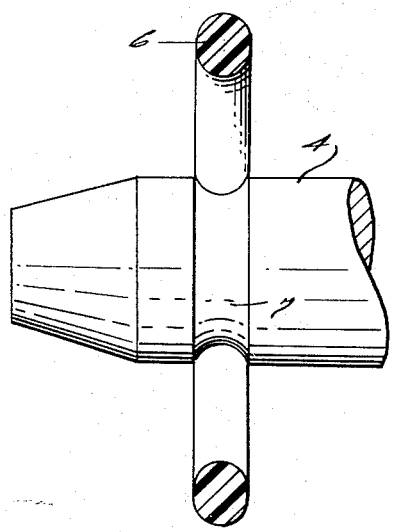
INVENTOR.
Howard P. Stock
BY Myron J. Seibold
ATTORNEY.

United States Patent Office 2,962,923
Patented Dec. 6, 1960

2,962,923

SLIP-ON PLASTIC FASTENER RING

Howard P. Stock, Brookfield, Wis., assignor to Square D Company, Detroit, Mich., a corporation of Michigan Continuation of application Ser. No. 416.530, Mar. 16, 1954. This application Oct. 21, 1958, Ser. No. 768,755

4 Claims. (Cl. 85—8.8)

This invention relates to fastening devices and is more particularly concerned with an improved type of fastener which is receivable in an annular groove in a shaft to retain machine parts in fixed longitudinal position on the shaft and is a continuation of application Serial Number 416,530, filed March 16, 1954, now abandoned.

While the fastener according to the present invention may be employed in a variety of applications, it is particularly applicable for holding a swingable armature assembly of an electromagnetic switch in longitudinal position on a shaft which serves as a pivotal axis for the armature. In devices of this type, occasionally the armature assembly must be removed in order to service the assembly. The employment of threaded nuts, conventional cotter keys and other conventional type fasteners which have been heretofore used to hold armatures in position have been found objectionable as tools and excessive time was usually required to remove and replace the fasteners in the securing position.

Prior attempts to provide fasteners which could be installed by slipping the fasteners over the end of the shaft for reception in an annular groove in the shaft have been largely unsuccessful. It has been found that when the fasteners were strong enough to hold the armature in position, tools were required to attach and remove the fastener. On the other hand, slip-on fasteners heretofore known which could be attached and removed without the use of tools have been found to have either insufficient strength to withstand longitudinal thrust or were destroyed by abrasion with moving parts.

The fastener according to the present invention overcomes the above deficiencies and (1) can be attached to or removed from a shaft by the use of one's fingers only; (2) will withstand the longitudinal thrust of the armature assembly; (3) will resist abrasion caused by rubbing against the armature assembly; (4) would not fail under millions of operations of the switch; and (5) is relatively inexpensive. No satisfactory metal fastener was found which would meet all of these conditions through an extremely long operating life.

In actual tests of prior metal slip-on fasteners, it was found that the prior fasteners would show signs of wear after a relatively few operations. Simply substituting nylon for metal was not possible because the nylon when formed in the shape of the metal fasteners would not provide a fastener which could stay in position.

Following these tests, the present invention was constructed and tested. Contrary to expectations, it was found that the fastener herein described, illustrated, and claimed, showed little wear and was still in a perfectly safe and usable operating condition after millions of operations. Thus the inexpensive fastener according to the present invention will withstand the repeated impacts without fracturing or chipping and provide sufficient resistance to abrasion to remain in operative condition for millions of operations compared to the prior fasteners heretofore known.

An object of the present invention is to provide a structure which overcomes the aforementioned deficiencies of prior structures.

Another object of the invention is to provide a slip-on fastener formed from nylon and so shaped that compression forces at the ends enlarge an opening in the center and that removal of said forces reduces the size of the opening.

Another object of the invention is to provide a fastener of the "ring" type formed in suitable shape of a substantially nonexpandable material with a memory which allows passage of the larger diameter portion of the element or pin with the return of the fastener toward its original shape when positioned in a groove or recess in the element.

Other objects and features of this invention will be readily apparent to those skilled in the art from the specification and appended drawing illustrating certain preferred embodiments in which:

Fig. 1 is a partial representation of an electromagnetically operated device in which an armature shaft is maintained in position on an operator by a fastener according to this invention.

Fig. 2 is an enlarged view of the fastener in position within the recess on the end of the armature shaft.

Fig. 3 is a plan view of the preferred form of fastener according to the present invention.

In Fig. 1 there is shown in part an electromagnetically operated device 1 having an operating coil 2 adapted to attract an armature 3, the armature being mounted on a shaft 4 which in turn passes through opposite legs of an operator 5 suitably guided for rectilinear movement. The fastener is indicated at 6 and is received in a groove or recess 7 adjacent the end of the shaft 4 as shown more particularly in Fig. 2.

The fastener is formed of a material with a memory of which one example is molded nylon, nylon being a generic name given to a family of polyamide resins. Since molded nylon is a distortable, substantially nonexpandable material which has a memory in that it will resume its original shape after distorting forces are removed, it was found ideally suited for the fastener 6 according to the present invention. The fastener 6, as shown in Fig. 3, must be non-circular in shape and is elongated and has an elongated slot 8 therein with an enlarged circular portion 9 adjacent the middle thereof. The circular portion 9 preferably has a diameter slightly less than the diameter of the recess 7 on the shaft on which it is to be mounted so that the fastener will be tight on the shaft, thus lessening wear on the fastener. Also, the enlarged central portion 9 prevents longitudinal movement of the fastener relative to the shaft and the elongated fastener construction provides a greater bearing surface.

It is to be noted that molded nylon and other materials with a memory are substantially non-expandable and may be said to be resilient only in the fact that they have a limited memory in returning to their original position when deformed. Another feature of molded nylon and similar materials with a memory is that if they should be deformed to a position from which they will not return, they can be replaced in their original memory position by deformation in the opposite direction.

Thus it is seen that the applicant has provided a fastener which is particularly adaptable to be received over the cylindrical end portion of a shaft 4 into snug engagement with an annular groove 7 adjacent the end portion of the shaft. The fastener 6 generally comprises an elongated body which has a length materially greater than its width and is formed of a distortable, substantially non-expandable material with a memory, such as nylon. The fastener itself is provided with an elongated slot 8 which extends longitudinally of its body, which slot has an enlargement 9 of generally circular configuration extending outwardly from both sides of the slot 8. The enlargement 9 indicated has its center on the longitudinal axis of the slot intermediate the ends of the slot and has a diameter slightly less than the diameter of the base of the groove wherein it is to be received. The outer contour of the body portion of the fastener is substantially the same as the contour of the slot and the enlargement. The body portion of the fastener 6 has a uniform cross-section throughout its length which is complementary in shape to the groove wherein the fastener is to be received. As has also been pointed out, the material from which the fastener is formed will permit compressive forces to be applied to the opposite ends of the body portion to reduce the length of the slot while simultaneously increasing the diameter of the enlargement. This will permit the body portion to be readily moved over the end portion of the shaft to a position where the enlargement is adjacent the groove. When the compressive forces on the body portion are relieved, the memory which is inherent in the material will cause the fastener to return toward its original shape so the body portion adjacent the enlargement will be snugly received in the groove.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. A fastener receivable over a cylindrical end portion of a shaft into snug engagement within an annular groove in said end portion of lesser diameter than said end portion, said fastener comprising an elongated body portion having a length materially greater than its width and formed from a distortable and substantially non-expandible, non-metallic material with a memory, an elongated slot extending longitudinally of said body portion, said slot having oppositely extending spaced end sections of substantially constant width and an enlargement disposed between the end sections of generally circular configuration extending outwardly from both sides of said slot, said enlargement having its center on the longitudinal axis of said slot intermediate of the length of said slot and normally having a diameter slightly less than the diameter of the base of said groove, the outer contour of said body portion being substantially the same as the contour of said slot and said enlargement, said body portion having an uninterrupted uniform cross-section throughout its length which is complementary to the cross-section of said groove, and the material of said body portion and the configuration thereof cooperating so that compression forces applied to opposite ends of the body portion reduces the length of the slot and concurrently increases the diameter of the enlargement, whereby the body portion may be slid over said end portion to position the body portion about said enlargement radially outward from said groove, and so that release of said compression forces increases the length of the slot and concurrently reduces the diameter of the enlargement, whereby the body portion about said enlargement may be received snugly in said groove.

2. A fastener in accordance with claim 1 characterized in that the material with a memory is nylon.

3. A fastener in accordance with claim 1 characterized in that said center of said enlargement is disposed substantially at the longitudinal midpoint of said slot.

4. A fastener in accordance with claim 1 characterized in that the cross-section of said body portion is circular.

References Cited in the file of this patent

UNITED STATES PATENTS

| 566,699 | Richardson | Aug. 25, 1896 |
| 1,321,974 | Bourque | Nov. 18, 1919 |
| 2,456,355 | Aber | Dec. 14, 1948 |

FOREIGN PATENTS

| 502,586 | France | Feb. 24, 1920 |
| 339,455 | Great Britain | Dec. 11, 1930 |
| 429,211 | Italy | Jan. 19, 1948 |